United States Patent [19]
Kakitani et al.

[11] 4,028,449
[45] June 7, 1977

[54] PROCESS FOR PREPARING A HIGHLY EXPANDED POLYVINYL CHLORIDE FOAM PRODUCT

[75] Inventors: Haruaki Kakitani; Masao Maekawa, both of Yokkaichi; Takashi Kokubo, Suzuka, all of Japan

[73] Assignee: Mitsubishi Monsanto Chemical Company, Tokyo, Japan

[22] Filed: Feb. 11, 1975

[21] Appl. No.: 548,924

[30] Foreign Application Priority Data

Feb. 13, 1974  Japan .............................. 49-17313
Mar. 15, 1974  Japan .............................. 49-29738

[52] U.S. Cl. .................. 264/45.3; 260/2.5 HA; 260/2.5 P; 264/54; 264/DIG. 5; 264/DIG. 13; 264/DIG. 17; 264/DIG. 18
[51] Int. Cl.² .......................................... B29D 27/00
[58] Field of Search ............ 264/DIG. 18, 211, 54, 264/DIG. 5, DIG. 13, DIG. 17; 260/2.5 E, 2.5 HA, 2.5 P

[56] References Cited

UNITED STATES PATENTS 3,200,089  8/1965  Landler et al. ............. 264/DIG. 18
3,390,105  6/1968  Verdol ........................ 264/DIG. 18

*Primary Examiner*—Philip Anderson
*Attorney, Agent, or Firm*—Oblon, Fisher, Spivak, McClelland & Maier

[57] ABSTRACT

An expanded polyvinyl chloride foam is prepared by a process characterized by admixing a polyvinyl chloride resin, which is prepared by emulsion copolymerization of a comonomer having an hydroxyl group, or a group capable of producing an hydroxyl group in the molecule under the processing conditions, with a plasticizer, a cross-linking agent, and a chemical blowing agent, introducing the admixture into a mold at a temperature lower than the melting temperature of said resin, and thereafter heating the resulting molded product to a temperature higher than the melting temperature of said resin to effect foam expansion.

10 Claims, No Drawings

PROCESS FOR PREPARING A HIGHLY EXPANDED POLYVINYL CHLORIDE FOAM PRODUCT

BACKGROUND OF THE INVENTION

1. Field of the Invention

The present invention relates to a process for preparing a highly expanded polyvinyl chloride foam product.

Description of the Prior Art

In spite of its excellent physical properties, such as fire retardance and weather resistance, expanded polyvinyl chloride foam (hereinafter called PVC foam) is not used with the wide-ranging application of, for example, polyurethane foam or polyolefin foam. The reasons for this include the fact that a highly expanded PVC foam (low density foam) is technically difficult to produce while, on the other hand, a low expanded PVC foam is not only expensive to manufacture but also is far inferior to polyurethane foam and polyolefin foam in performance for such applications as cushioning and heat insulation.

In the conventional method for preparing a highly expanded PVC foam, high-pressure equipment is required because of the need to foam the PVC with an inert gas under elevated pressure, or by decomposition of a chemical blowing agent. The productivity rate of said methods is quite low, because these methods require batch type systems. Consequently, the foam obtained in these manners is very expensive and is used only where specifically required. thus, pressurized expansion methods are not universally employed industrially, even though a highly expanded PVC foam can be obtained thereby.

Furthermore, highly expanded PVC foam cannot be made using such processing equipment as calenders or extruders which are usually used in the manufacture of PVC foam. The expanded PVC foam obtained by conventional calender processing is prepared by blending a plasticizer, a stabilizer, and a chemical blowing agent with an ordinary PVC. Calendering must occur at a temperature such that the chemical blowing agent is not decomposed. After calendering, the product is heated in hot air to effect expansion. Unfortunately, expansion by calender processing is only applicable to the manufacture of sponge leather, etc., since the degree of expansion obtainable is at most only 3 to 5 times. If the extent of foaming is increased beyond this, the cells tend to break down, which results in the formation of a foam which is unsuitable for practical use.

Another conventional method for manufacturing an expanded PVC foam is by use of a chemical blowing agent in combination with a stabilizer and other additives. After the blend with PVC is formed, the blend is milled in an extruder to cause the chemical blowing agent to decompose. The gas produced is pressurized and dispersed in the cylinder containing the melt and is expanded at the same time that the blend is extruded through a die. Even using this method, however, the extent of foaming is limited to 3 or 4 times, and it is very difficult to obtain an expanded foamed product which is suitable for many commercial applications.

Two other techniques attempted in the prior art for preparing PVC foam include the use of a plastisol. One of those techniques is the elastomer proces which uses carbon dioxide, and the other is the "mechanical froth process" which requires the addition of specific surface active agents followed by mechanical whipping. In the elastomer process, a special apparatus is needed to effect the absorption of the carbon dioxide by the plastisol under elevated pressure at low temperatures. This manufacturing technique is not only complicated, but also the achievable extent of foaming is limited to, at most, 20 times. In the mechanical froth process, the extent of foaming is limited to about 5 to 10 times, and a product having a density comparable to polyurethane foam of 0.02 g/cc cannot be obtained.

It would be highly desirable to have a process for efficient and effective preparation of highly expanded polyvinyl chloride foam on an industrial scale.

SUMMARY OF THE INVENTION

Accordingly, it is one object of the present invention to provide a process for preparation of PVC foam in high expansion.

It is another object of the present invention to provide a process for preparing a highly expanded PVC foam at low pressures using ordinary industrial processing equipment.

These and other objects of the invention, which will hereinafter become apparent by the discussion below, are achieved in a process for preparing an expanded PVC foam characterized by molding a polyvinyl chloride resin composition comprising a vinyl chloride copolymer mainly composed of vinyl chloride, obtained by emulsion copolymerization of a vinyl chloride monomer and comonomer having an hydroxyl group or a group capable of producing an hydroxyl group, a plasticizer, a crosslinking agent and a chemical blowing agent, at a temperature lower than the melting temperature of the composition with or without milling and thereafter heat treating the resulting molded product at a temperature higher than the melting temperature of the molded product in order to expand it into a foam.

DESCRIPTION OF THE PREFERRED EMBODIMENTS

The cross-linkable PVC copolymer used as a base material in the present invention can be prepared, for example, by copolymerizing vinyl chloride monomer and a comonomer having an hydroxyl group in the molecule. Suitable comonomers include 2-hydroxyethylacrylate, 2-hydroxyethylmethacrylate, 2-hydroxypropyl acrylate, 2-hydroxypropyl methacrylate, 3-chloro-2-hydroxypropyl methacrylate, 3-chloro-2-hydroxypropyl acrylate, 3-hydroxybutyl acrylate, ethyl-2-hydroxyethyl fumarate, hydroxybutyl vinylether, etc.

Alternatively, the cross-linkable copolymer used in the process of the present invention can be obtained by chemically treating a PVC copolymer containing a group capable of producing an hydroxyl group within the molecule upon such chemical treatment. For example, suitable methods include hydrolyzing a copolymer of vinyl chloride and vinyl ester monomer, treating a copolymer of vinyl chloride and a vinyl monomer having an epoxy group with an acid, and hydrolyzing a copolymer of vinyl chloride and N-alkoxy acrylamide. Additionally, there may be used in the present invention a cross-linkable PVC copolymer having a group capable of producing an hydroxyl group in its structure during the kneading and molding without chemical treatment, for example, a copolymer of vinyl chloride and N-alkoxy acrylamide or a vinyl monomer having an epoxy group. The cross-linkable PVC copolymer used in the present invention is prepared by emulsion polymerization. In order to obtain a highlyfoamed product, it is essential that the cross-linkable PVC copolymer be cross-linked before foaming. However, when the polymer is cross-linked in an extruder, calender or other processing machine, it is not possible to obtain a molded product having a smooth surface and good dimensional accuracy, since the moldability deteriorates due to a so-called "scorching phenomenon." In the molding of a polymer accompanied by a cross-linking reaction, it is indispensable that the scorching phenomenon be avoided. Although, in the case of a peroxide cross-linking reaction of PVC, the scorching phenomenon can be avoided by proper selection of a peroxide which will not be decomposed at the temperature of milling and molding, it is difficult to avoid the scorching phenomenon in a functional group cross-linking reaction by mere reduction in temperature, because the temperature dependency of the cross-linking rate is comparatively low. That is, once PVC becomes fluid by kneading, the functional groups react immediately regardless of the temperature and the PVC becomes cross-linked. On the other hand, when PVC obtained by suspension polymerization or bulk polymerization is molded, the PVC must be gelled and transformed to the fluid starter by kneading. If the PVC is molded when it is not yet sufficiently fluid, a product having a smooth surface and excellent appearance cannot be obtained. Since it is difficult to melt the PVC in a subsequent step, even by heating, a highly foamed product cannot be obtained. Consequently, it is impossible to obtain a molded article which is not scorched, has excellent appearance and is easily highly foamed by subsequent heating of a cross-linkable PVC copolymer prepared by suspension polymerization or bulk polymerization.

On the contrary, a molded product having a smooth surface and excellent appearance can be obtained from a cross-linkable PVC copolymer prepared by emulsion polymerization without scorching, since such a copolymer can be molded at a temperature far lower than the melting temperature. Also, the molded product thus obtained can be made fluid by easily and rapidly heating in a subsequent step wherein cross-linking can be simultaneously effected. Thus, the cross-linkable PVC copolymer in the present invention must be prepared by emulsion polymerization.

The term "emulsion polymerization" referred to herein includes a polymerization method wherein a monomer is polymerized in an emulsion state and the polymer so obtained has a particle size of 0.1 to 5 microns. In a typical emulsion polymerization process, sodium lauryl sulfate, sodium laurate, sodium alkylbenzene sulfonate, or the like is used as the emulsifier and potassium persulfate, hydrogen peroxide, or the like is used as the polymerization catalyst. Furthermore, the method of emulsifying a monomer by using a homogenizer can be used during polymerization, although the cross-linkable PVC copolymer advantageously employed in the present invention is 0.1 to 5 micrometers in particle size.

In order to obtain a highly-foamed product according to the preparation process of the present invention, it is desirable to use a cross-linkable PVC copolymer containing preferably 0.5 to 10% of a comonomer having an hydroxyl group in the molecule as described above. When the comonomer content is below 0.5%, the cross-linking is unsatisfactory; if above 10%, the desirable excellent properties of PVC will not occur.

The cross-linking agent used in the present invention is a compound having two functional groups in one molecule which can react with an hydroxyl group in the copolymer molecule. Suitable cross-linking agents include compounds having isocyanate groups, carboxyl groups, epoxy groups, or alkoxy groups, and dibasic acids and their anhydrides; suitably, tolylene diisocyanate, diphenylmethane diisocyanate, hexamethylene diisocyanate, trimethylol propane tolylene diisocyanate adduct, polymethylene polyphenyl diisocyanate, succinic acid, glutaric acid, adipic acid, pimelic acid, azelaic acid, phthalic acid, maleic acid, cyclohexane dicarboxylic acid, and anhydrides of these acids, as well as the series of epoxies represented by the formula

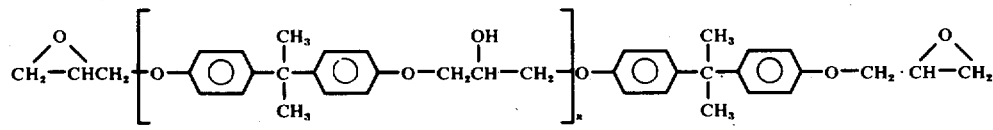

wherein $n$ is an integer from 0 to 10, and triglycidyl diisocyanurate, n-butylated melamine resin, etc.

The amount of cross-linking agent used in the present invention is generally 0.5 to 10 parts, by weight, to 100 parts, by weight, of copolymer, although this ratio varies with the kind of cross-linking agent and the composition of the copolymer. For a given composition of copolymer, the larger the amount of cross-linking agent, the higher the degree of cross-linking.

The chemical blowing agent used in the present invention is not particularly critical and may be any agent normally used for chemical foaming of PVC. These chemical blowing agents are decomposed by heat to generate gas, and typically include dinitrosopentamethylene tetramine, azodicarbonamide, p,p'-oxybisbenzene sulfonylhydrazide, para-toluene sulfonylhydrazide, benzene sulfonylhydrazide, etc. The chemical blowing agent used in the present invention may be selected from those having a decomposition temperature higher than the melting temperature of the cross-linkable PVC copolymer composition. The amount of chemical blowing agent used is generally 5 to 40 parts, by weight, to 100 parts, by weight, of cross-linkable PVC copolymer composition, although the ratio can vary with the desired extent of foaming.

In order to obtain a foamed product in the process of the present invention, in addition to the above-mentioned cross-linking agent and chemical blowing agent, a stabilizer, a filler, a pigment, or the like may be blended. A plasticizer may optionally be used depending on the hardness desired in the foamed product.

In carrying out the process of the present invention, the necessary components are blended using ordinary PVC processing apparatus, such as a ribbon blender, a Henschel mixer, or the like conventional equipment. However, in the case where the amount of plasticizer blended is large, a kneader is employed for mixing since the blend is sometimes quite viscous.

Subsequently, the above mixture is kneaded on mill rolls and thereafter is molded to the desired thickness of film or sheet using a calender. In the case of extrusion processing, the mixture is extruded to form a film, sheet, tube or rod, either as it is or after being pelleted by kneading with mill rolls. Also, the mixture may be injected to form a molded product, either as it is, or as a pellet.

In the case of kneading with mill rolls, calendering, extrusion or injection processing, it is most important to work at a temperature lower than the melting temperature of the above-described cross-linkable PVC copolymer compositon in order to avoid the scorching phenomenon. The term "melting" herein refers to the point at which the cross-linking PVC copolymer composition becomes a homogeneous melt by kneading at an elevated temperature. Once such melting sets in, a radical cross-linking reaction takes place, thereby producing scorching, wherein the subsequent molding processing becomes extremely difficult. Conversely, it has become clear that, when the temperature is maintained below melting, scorching does not occur even though cross-linking takes place to some degree during kneading and molding. This is an extraordinarily unexpected result. This phenomenon has been found to be greatly advantageous in the present invention, where copolymers prepared by emulsion polymerization are used. This partial cross-linking of the molded product is advantageous in that the shape of the molded product can be maintained even at elevated temperatures during the subsequent heat-foaming step.

The required kneading temperature for the above-mentioned PVC composition cannot be specified generally because it varies with the composition of cross-linkable PVC copolymer and the type and amount of compounding agent. However, the temperature requirement to achieve processing without scorching may be fulfilled usually in the range of 80° to 170° C. of the above melting temperature.

Thus, a most important point in the practice of the present invention is to mold and process a PVC composition at such a temperature that the PVC composition will be homogenized in a calender, extruder or injection molding machine. The lower the molding and processing temperature, the better will be the foam obtained in the subsequent heating step. Processing at a temperature above 170° C is unnecessary. Furthermore, the PVC compositon should not be foamed in a step wherein the composition is also molded and processed into a film, sheet or tube by calendering, extrusion or injection molding.

This latter requirement is easily met by selecting a chemical blowing agent having a decomposition temperature higher than the molding temperature of the PVC composition. In the subsequent step, the abovedescribed molded product should be heated to a temperature which is higher than the melting temperature of the PVC composition whereby it becomes cross-linked. Simultaneously, decomposition of the chemical blowing agent generates gas, thereby effecting foaming. The heat imput for the foaming is supplied by hot air, infrared heating, or high-frequency heating. This step is carried out subsequent to the abovedescribed molding step. In this step, melting and cross-linking are carried out simultaneously. The temperature should be higher than the melting temperature and should be at the optimum point for foaming. On the other hand, the optimum foaming temperature may be previously determined by proper selection of the combination of chemical blowing agent and stabilizer. As a result of this process, a PVC product with an extent of foaming of at least 15 times and with a dense and uniform cell structure can be obtained.

The expanded foam product of the present invention can also be obtained by applying the conventional plastisol processing methods, such as spread coating, rotational molding, slush molding, and the like to a plastisol form of vinyl chloride resin composition comprising the above-mentioned cross-linkable PVC copolymer, a plasticizer, a cross-linking agent, a chemical blowing agent, and a stabilizer.

As described above in detail, according to the process of the present invention, a commercially valuable foamed PVC product which is extremely high in foamability (at least 15 times), and which can provide a smooth surfaced foamed product having excellent physical characteristics, such as excellent fire retardance and excellent weather resistance which are characteristic of PVC resins can be obtained.

Having generally described the invention, a more complete understanding can be obtained by reference to certain specific Examples, which are included for purposes of illustration only and are not intended to be limiting unless otherwise specified. In these Examples, "part(s)" means "part(s) by weight". The cross-linkable PVC copolymers used in the Examples and Comparative Examples and the vinyl chloride homopolymers used in the Comparative Examples are obtained by the following emulsion polymerization:

1. Copolymer (A): Vinyl chloride-2-hydroxypropyl acrylate copolymer.

900 ml of water, 5 g of sodium lauryl sulfate and 3 g of potassium persulfate were charged into an autoclave of 3l in volume, degassed under vacuum and heated to 50° C. After putting 700 g of vinyl chloride monomer thereinto under pressure while stirring, 75 ml of aqueous solution of 2-hydroxypropyl acrylate (14g/100 ml) were continuously added thereto at the rate of 0.6 ml/min. The copolymerization reaction was completed in 4 hours and the conversion was 87%. The latex so obtained was coagulated with an aqueous solution of calcium chloride and then dried.

2. Copolymer (B): Vinyl chloride-hydroxymethyl methacrylate copolymer

According to the same method as used in (1), 75 ml of aqueous solution of hydroxyethyl methacrylate (14 g/100 ml) were substituted as the comonomer and were continuously added at the rate of 0.6 ml/min. under stirring to be copolymerized. The conversion was 86%. The latex obtained was treated in the same manner as (1).

3. Copolymer (C): Vinyl chloride-3-chloro-2-hydroxypropyl acrylate copolymer

According to the same method as used in (1), 100 ml of aqueous solution of 3-chloro-2-hydroxypropyl acrylate (14 g/100 ml) were used as a comonomer and were continuously added at the rate of 0.8 ml/min. under stirring to be copolymerized. The conversion was 83% and the latex obtained was treated in the same manner as (1).

4. Copolymer (D): Vinyl chloride-ethyl-2-hydroxyethyl fumarate copolymer

According to the same method as used in (1), 100 ml of methyl alcohol solution of ethyl-2-hydroxyethyl fumarate (14 g/100 ml) were used as a comonomer and were continuously added at the rate of 0.8 ml/min. under stirring to be copolymerized. The conversion was 85% and the latex obtained was treated in the same manner as (1).

5. Polymer (E): Vinyl chloride homopolymer

According to the same method as used in (1), vinyl chloride was polymerized without using a comonomer and the latex obtained was treated in the same manner as (1).

EXAMPLES 1 to 4

To 100 parts each of the cross-linkable PVC copolymers (A), (B), (C) and (D) obtained in (1), (2), (3) and (4) above, respectively, 80 parts of dioctylphthalate (plasticizer), 4 parts of cross-linking agent, azodicarbonamide (chemical blowing agent, the amount used is described in Table 1) and 3parts of Ca-Zn stabilizer (main ingredient: Zn) were compounded and were molded into a film of 0.5 mm thickness by a test calender at 140° C. The film was heated in a hot-air oven at 200° C for 5 minutes, whereby it was expanded into a foam. The expanded foams so obtained were inspected for the state of their cells and ranked quantitatively. The density of the foams was measured to provide a measure of the extent of foaming. In order to obtain the degree of cross-linking of the foams, soluble components were extracted therefrom with tetrahydrofuran, thereby providing gel%. Herein, the gel% is the proportion of tetrahydrofuran insolubles to total PVC.

The compositions used in the above-mentioned calendering processing melt at about 160° C. No scorching phenomenon was observed during the calendering processing at 140° C and the films obtained were smooth in surface. The above results are summarized in Table 1.

TABLE 1

| Example | Polymer | Cross-linking agent | Azodicarbon-amide (parts) | Gel (%) | Extent of foaming (times) | State of cell (Note 1) |
|---|---|---|---|---|---|---|
| 1 | Copolymer (A) | Trimethylol-propane tolylene diisocyanate | 20 | 63.4 | 38.4 | A |
| | | n-Butylated meta-mine resin | 20 | 41.5 | 33.7 | A |
| | | Diphenylmethane diisocyanate | 20 | 58.3 | 37.8 | A |
| | | " | 30 | 57.6 | 48.4 | A |
| 2 | Copolymer (B) | Trimethylol-propane tolylene diisocyanate | 20 | 46.4 | 28.7 | A |
| | | Diphenylmethane diisocyanate | 20 | 40.2 | 32.0 | A |
| 3 | Copolymer (C) | Trimethylol-propane tolylene diisocyanate | 20 | 58.2 | 27.4 | A ~ B |
| | | Diphenyl-methane diisocyanate | 20 | 45.9 | 21.8 | A ~ B |
| | | n-Butylated metamine resin | 20 | 56.7 | 16.4 | A |
| 4 | Copolymer (D) | Trimethylol-propane tolylene diisocyanate | 20 | 41.3 | 22.7 | A |
| | | Diphenyl-methane diisocyanate | 20 | 47.8 | 21.8 | A |

Note 1:
The state of the cells was categorized into five classes: A - E, A for the best and E for the worst. The classifications were the result of a quantitative measure of the density and an observational judgment of the uniformity of the cell structure.

COMPARATIVE EXAMPLES 1 to 4

Films were prepared using the cross-linkable PVC copolymers (A), (B), and (D) obtained by the above-described emulsion copolymerizations (1), (2) and (4), respectively, in the same manner as in Examples 1 to 4 except that a cross-linking agent was not compounded, and thereafter, the films were heated and expanded into a foam. The expanded foams so obtained were ranked as to cell state, and the extent of foaming and gel% were obtained in the same manner as for Examples 1 to 4.

Additionally, a film was made in this same manner with the exception of using vinyl chloride homopolymer (E) obtained by the emulsion polymerization (5), and the film was heated and expanded into a foam. The expanded foam was ranked as to its cell state, and the extent of foaming and gel% were obtained in the same manner.

The above results are summarized in Table 2.

TABLE 2

| Comparative Example | Polymer | Cross-linking agent | Azodicarbon-amide (part) | Gel (%) | Extent of foaming (Note 2) | State of cell |
|---|---|---|---|---|---|---|
| 1 | (A) | — | 10 | 0 | about 10 | E |
| | | — | 20 | 0 | Measurement impossible | E |
| 2 | (B) | — | 20 | 0 | " | E |
| 3 | (D) | — | 20 | 0 | Measurement impossible | E |
| | | — | 10 | 0 | about 10 Measure- | E |

TABLE 2-continued

| Comparative Example | Polymer | Cross-linking agent | Azodicarbonamide (part) | Gel (%) | Extent of foaming (Note 2) | State of cell |
|---|---|---|---|---|---|---|
| | | — | 20 | 0 | ment impossible | E |
| 4 | PVC Homopolymer (E) | Diphenylmethane diisocyanate | 10 | 0 | about 10 | E |
| | | " | 20 | 0 | Measurement impossible | E |
| | | n-Butylated metamine resin | 10 | 0 | about 10 | E |
| | | Trimethylolpropane tolylene diisocyanate | 10 | 0 | " | E |
| | | Triglycidyl isocyanate | 10 | 0 | " | E |

Note 2:

The term "measurement impossible" means that the state of the cells was extremely bad and that the thickness of expanded foam was so non-uniform that the density could not be measured. Inspecting Table 1 (Examples 1 to 4) and Table 2 (Comparative Examples 1 – 4), it is evident that the expanded PVC foams obtained by using a calender according to the process of the present invention (Examples 1 to 4) are very high in extent of foaming to a degree that has not hitherto been obtained, are dense and uniform and have the highest quality cell states.

EXAMPLE 5

100 parts of cross-linkable PVC copolymer (A) obtained by emulsion polymerization (1), 90 parts of dioctylphthalate, 4 parts of diphenylmethane diisocyanate, 20 parts of azodicarbonamide and 3 parts of Ca-Zn stabilizer were compounded and kneaded by a mill-roll at 140° C to prepare pellets. The pellets were extruded into a sheet through a T-die by means of a 38 mm extruder. With a cylinder temperature of 130° C and a die temperature of 140° C, a sheet of 1 mm thickness and smooth in surface was extruded. The sheet was heated in a hot-air oven at 200° C for 5 minutes to obtain an expanded foam of 3 mm in thickness. The quality of the expanded PVC foam was excellent, having an extent of foaming of 31.4 times and the surface skin layer was uniform in cellular structure.

EXAMPLE 6

100 parts of cross-linkable PVC copolymer (A) obtained by emulsion polymerization (1), 50 parts of dioctylphthalate, 4 parts of diphenylmethane diisocyanate, 15 parts of azodicarbonamide and Ca-Zn stabilizer were compounded and kneaded at 140° C to make pellets. The pellets were extruded into a rod by means of a 38 mm extruder. With a cylinder temperature of 130° C and a die temperature of 140° C, a rod of 10 mm in diameter and smooth in surface was molded. The rod was heated in a hot-air oven at 200° C for 7 minutes to obtain an expanded foam of 25 mm in diameter. The foam quality was excellent, having an extent of foaming of 18.4 times and the surface skin layer was uniform in cellular structure.

Having now fully described the invention, it will be apparent to one of ordinary skill in the art that many changes and modifications can be made thereto without departing from the spirit or scope of the invention as set forth herein.

WHAT IS CLAIMED AND INTENDED TO BE COVERED BY LETTERS PATENT IS:

1. A process for preparing an expanded polyvinyl chloride foam, which comprises:
   admixing a polyvinyl chloride resin which is prepared by emulsion polymerization of vinylchloride and a comonomer having a hydroxyl group, with a plasticizer, a cross-linking agent and a chemical blowing agent;
   forming a preform of said mixture by introducing the mixture into a mold at a temperature lower than the melting temperature of said resin, wherein said melting temperature is defined as that temperature at which the cross-linkable polyvinyl chloride copolymer composition becomes a homogeneous melt by kneading at an elevated temperature;
   and thereafter effecting foam expansion of the resulting molded preform by heating said preform to a temperature higher than the melting temperature of said resin.

2. The process of claim 1, wherein said comonomer is selected from the group consisting of 2-hydroxyethyl acrylate, 2-hydroxyethyl methacrylate, 2-hydroxypropyl acrylate, 2-hydroxypropyl methacrylate, 3-chloro-2-hydroxypropyl methacrylate, 3-chloro-2-hydroxypropyl acrylate, 3-hydroxybutyl acrylate, ethyl-2-hydroxyethyl fumarate and hydroxybutyl vinyl ether.

3. The process of claim 1, wherein the content of said comonomer in said vinyl chloride copolymer is 0.5 to 10% by weight.

4. The process of claim 1, wherein said cross-linking agent is selected from the group consisting of tolylene diisocyanate, diphenylmethane diisocyanate, hexamethylene diisocyanate, trimethylol propanetolylene diisocyanate adduct, polymethylene polyphenyl diisocyanate, n-butylated melamine resin, succinic acid, glutaric acid, adipic acid, pimellic acid, azelaic acid, phthalic acid, maleic acid, cyclohexane dicarboxylic acid and anhydrides thereof, triglycydyl diisocyanurate and an epoxy compound represented by the formula

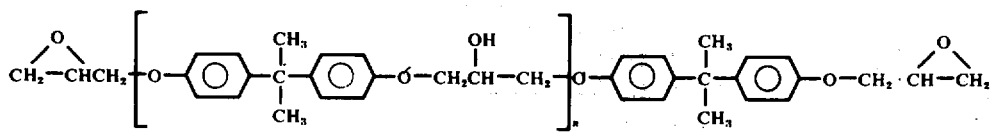

, wherein *n* is an integer from 1 to 10.

5. The process of claim 1, wherein said cross-linking agent is used in an amount of 0.5 to 10 parts by weight to 100 parts by weight of said vinyl chloride copolymer.

6. The process of claim 1, wherein said chemical blowing agent is selected from the group consisting of dinitrosopentamethylene tetramine, azodiacarbonamide, p,p'-oxybisbenzene sulfonyl hydrazide, para-toluene sulfonyl hydrazide and benzene sulfonyl hydrazide.

7. Th process of claim 1, wherein said chemical blowing agent is used in an amount of 5 to 40 parts by weight to 100 parts of weight of said vinyl chloride resin composition.

8. The process of claim 1, wherein a filler, stabilizer or pigment is added to said admixture.

9. The process of claim 1, wherein said admixture is kneaded prior to introduction into said mold.

10. The process of claim 9, wherein the kneading temperature of said vinyl chloride resin composition is within the range of 80° to 170° C.